J. P. Manny.
Cotton Bale Tie.
Nº 20,809.        Patented Jul. 6, 1858.

UNITED STATES PATENT OFFICE.

J. P. MANNY, OF ROCKFORD, ILLINOIS.

IMPROVED MODE OF SECURING GRAIN IN BUNDLES OR SHEAVES.

Specification forming part of Letters Patent No. 20,809, dated July 6, 1858.

*To all whom it may concern:*

Be it known that I, JOHN P. MANNY, of Rockford, in the county of Winnebago and State of Illinois, have invented a new and useful Mode of Automatically Binding or Securing Grain in Bundles or Sheaves; and I do hereby declare the following to be a full, clear, and exact description of the same, reference being had to the accompanying drawings, making a part of this specification, in which—

Figure 4:
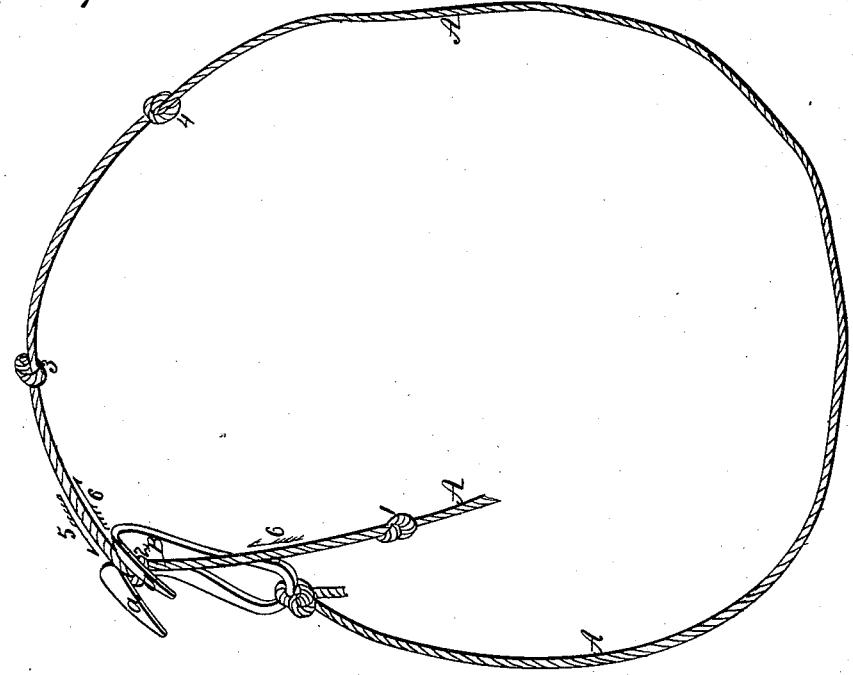
Figure 3:
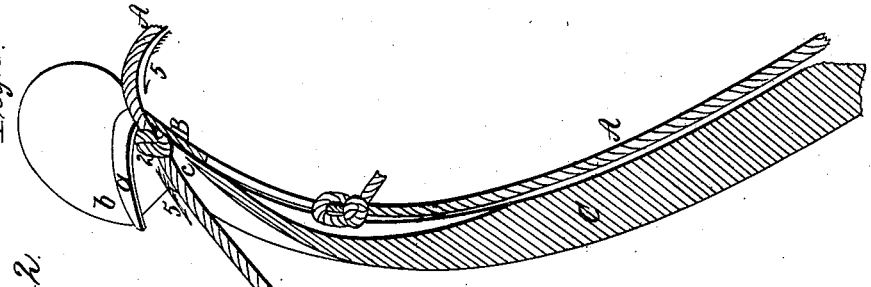
Figure 2:
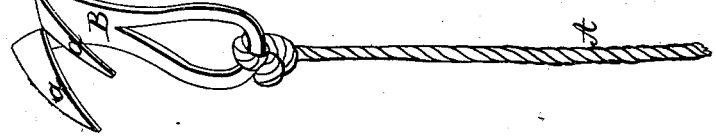
Figure 1:
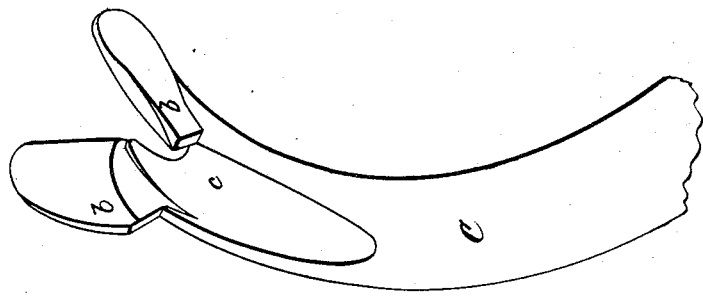

Figure 1 represents the fork or rest in which the hook at one end of the band is placed. Fig. 2 represents the hook, with a portion of the cord which forms the band attached to it. Fig. 3 represents a section through the forked rest and hook when placed together, and showing the position of the rope or cord and its connection to the hook at both of its ends. Fig. 4 represents the band as it appears when inclosing the bundle or sheaf of grain.

Similar letters of reference, where they occur in the several figures, denote like parts of the band and contrivance for fastening it in all of them.

In an application for a patent which bears even date with this application, and to which special reference is herein made, I have represented and described a broad web, with a single hook, for a band to secure the bundles, and have also shown the manner in which that fastening is put on, in which case the hook is thrust through or into the web, to form the fastening. In this application I use a two-pronged hook, or forked hook, and a rope or cord with knots in it, which makes a more simple, durable, and cheaper band, as it can be used over and over again without wearing out.

My invention consists in the use of a band, composed of a rope or cord, with a forked hook at one of its ends, and a knot or series of knots, or their equivalents, at its other end, when said band is used for the purpose herein named.

To enable others skilled in the art to make and use my invention, I will proceed to describe the same with reference to the drawings.

A represents a rope or cord, of sufficient length to pass around an ordinary bundle or sheaf of grain, with an additional length (for convenience) to allow the end to be caught, held, or drawn up tight. On one end of this rope or cord there is a metallic hook, B, of the form shown at Figs. 2 and 4, it having two jaws or forks, *a a*, and at or near the other end of said rope or cord there may be a series of knots or projections, 1 2 3 4, or their equivalents, which will readily slip through the forks of the hook when drawn in the direction of the arrow 5, but which, when drawn in the contrary direction, as shown by the arrow 6, will drop between the forks of the hook and be firmly held there by the expansion of the gavel or bundle of grain which it surrounds, and thus forming a strong fastening.

When this band is used on my machine instead of the web-and-hook band, the knotted end of the band is held by a contrivance substituted for that shown for using the web-band, and the hook is laid by the attendant into the forks *b b* of the bent lever or arm C, as shown in Fig. 3 of the accompanying drawings, said bent lever C being cut under at *c* to allow for the knot 2 (or any other one of the series) to slip under the forks or jaws *a a* of the hook B.

The bent lever C may be operated in the same manner as the lever is that carries the web-band in the before-described application. By slipping the hook past the knobs until the bundle is tightly bound, and then, by letting go, the expansion of the grain draws the knot tight under the jaws *a a*, as seen at Figs. 3, 4, which completes the operation.

I do not confine myself to any special machinery for passing this band around the bundle of grain, as that may be done in a variety of ways.

My invention consists in the use of a short band (each band of suitable length for a single bundle) laid in its proper place by hand, but automatically passed around the bundle and fastened or tied by the expansion of the bundles when released.

I believe I am the first to cause the expansion of the clasped-up bundle to form the tie, fastening, or knot between the ends of a bond, and to hold said ends tightly. And I further believe that I am the first to automatically bind grain with short bands, or bands cut in suitable lengths for each separate bundle, and placed in proper position by hand, and which form their own fastening by the expansion of the gavel when released. And I shall therefore construe my claim broadly to such a band, for the purpose specified, whatever may be the means of passing it around the bundle and fastening it, so long as it is done automatically and fastens itself in the manner set forth.

Having thus fully described the nature of my invention in securing grain in bundles, what I claim therein as new, and desire to secure by Letters Patent, is—

The use of a short band, cut in suitable lengths for separate bundles, placed in proper position by hand, and automatically passed around the bundle and fastened by the expansion of the bundle when released, substantially in the manner set forth.

JOHN P. MANNY.

Witnesses:
　A. B. STOUGHTON,
　THOS. H. UPPERMAN.